US007874161B2

(12) United States Patent
Williams

(10) Patent No.: US 7,874,161 B2
(45) Date of Patent: Jan. 25, 2011

(54) COMPRESSOR INLET GUIDE VANE FLOW BASED ANTI-ICE FORMATION CONTROL SYSTEM AND METHOD

(75) Inventor: Darrell R. Williams, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 890 days.

(21) Appl. No.: 11/782,882

(22) Filed: Jul. 25, 2007

(65) Prior Publication Data

US 2009/0097962 A1 Apr. 16, 2009

(51) Int. Cl.
*F02C 1/00* (2006.01)

(52) U.S. Cl. .................................... 60/772; 60/39.093

(58) Field of Classification Search ............. 60/39.093, 60/772, 779, 794; 415/160, 161
See application file for complete search history.

(56) References Cited

U.S. PATENT DOCUMENTS

| | | | | |
|---|---|---|---|---|
| 3,367,565 | A | | 2/1968 | Urban |
| 3,979,903 | A | | 9/1976 | Hull, Jr. et al. |
| 4,060,980 | A | | 12/1977 | Elsaesser et al. |
| 4,809,497 | A | * | 3/1989 | Schuh ...................... 60/39.27 |
| 5,042,245 | A | | 8/1991 | Zickwolf, Jr. |
| 5,115,635 | A | | 5/1992 | Jennings et al. |
| 5,165,849 | A | * | 11/1992 | Nakagawa et al. ....... 415/208.1 |
| 5,375,412 | A | | 12/1994 | Khalid et al. |
| 5,857,321 | A | | 1/1999 | Rajamani et al. |
| 6,364,602 | B1 | | 4/2002 | Andrew et al. |
| 6,823,253 | B2 | | 11/2004 | Brunell |
| 6,895,325 | B1 | | 5/2005 | Munson, Jr. |
| 6,935,119 | B2 | | 8/2005 | Placko et al. |
| 2003/0014978 | A1 | | 1/2003 | Horii et al. |
| 2003/0053906 | A1 | * | 3/2003 | Itou et al. ...................... 415/1 |
| 2004/0088060 | A1 | | 5/2004 | Renou et al. |
| 2006/0042258 | A1 | | 3/2006 | Gadde et al. |
| 2006/0080965 | A1 | | 4/2006 | Healy |
| 2006/0101826 | A1 | * | 5/2006 | Martis et al. .................. 60/794 |
| 2006/0184255 | A1 | | 8/2006 | Dixon et al. |
| 2006/0201132 | A1 | * | 9/2006 | Hirayama et al. .......... 60/39.27 |
| 2006/0220472 | A1 | * | 10/2006 | Fecamp et al. .............. 307/153 |
| 2007/0031238 | A1 | | 2/2007 | Fujii et al. |
| 2007/0193249 | A1 | * | 8/2007 | Takashima et al. ....... 60/39.181 |

* cited by examiner

*Primary Examiner*—Michael Cuff
*Assistant Examiner*—Phutthiwat Wongwian
(74) *Attorney, Agent, or Firm*—Ingrassia Fisher & Lorenz, P.C.

(57) ABSTRACT

A system and method are provided for effectively removing ice that may have formed on gas turbine engine compressor inlet guide vanes and/or preventing, or at least inhibiting, reformation of ice on gas turbine engine compressor inlet guide vanes after the ice has been removed. A determination is made as to whether flow through the compressor is below a predetermined flow value. If the flow through the compressor is below the predetermined flow value, then the inlet guide vanes are repeatedly moved between at least two predetermined positions to remove ice and/or prevent, or at least inhibit, reformation of ice on the inlet guide vanes.

17 Claims, 7 Drawing Sheets

COMPRESSOR INLET GUIDE VANE FLOW BASED ANTI-ICE FORMATION CONTROL SYSTEM AND METHOD

TECHNICAL FIELD

The present invention generally relates to compressor inlet guide vane control and, more particularly, to a compressor inlet guide vane control system and method that de-ices, and prevents subsequent ice formation on, compressor inlet guide vanes based on flow through the compressor.

BACKGROUND

Gas turbine engines may be used to power various types of vehicles and systems. A typical gas turbine engine includes at least a compressor, a combustor, and a turbine, and may include additional components and systems, depending on the particular end-use of the gas turbine engine. During operation of a gas turbine engine, the compressor draws in, and raises the pressure of, ambient air to a relatively high level. The compressed air from the compressor is then directed into the combustor, where a ring of fuel nozzles injects a steady stream of fuel. The injected fuel is ignited, which significantly increases the energy of the compressed air. The high-energy compressed air from the combustor then flows into and through the turbine, causing rotationally mounted turbine blades to rotate.

A gas turbine engine may be used to supply propulsion power, electrical power, and/or pneumatic power. For example, many aircraft use gas turbine engines as auxiliary power units to supply pneumatic power for various systems and functions. These systems and functions may vary, and may include the aircraft environmental control system, the cabin pressure control system, and/or main engine start (MES) air. The pneumatic power is, in many instances, provided by bleeding compressed air from a centrifugal load compressor that is driven by the turbine.

More specifically, during gas turbine engine operation, the load compressor draws in ambient air, via an air inlet, and compresses the air. A plurality of inlet guide vanes are mounted adjacent the inlet and are movable via one or more actuators. By selectively adjusting the position of the inlet guide vanes the flow rate of air entering the load compressor, and thus the flow rate of bleed air supplied to the various systems and functions, may be regulated.

Gas turbine engines, such as those described above, may be exposed to various environmental conditions, including those that may result in ice formation at the inlet to the load compressor. Ice formation on the inlet guide vanes can result in reduced airflow through the load compressor and the inability to move the inlet guide vanes. Reduced airflow through the load compressor can have various deleterious effects on compressor operation and gas turbine engine performance.

Hence, there is a need for a system and method of effectively removing ice that may have formed on gas turbine engine compressor inlet guide vanes and/or preventing, or at least inhibiting, reformation of ice on gas turbine engine compressor inlet guide vanes after the ice has been removed. The present invention addresses at least this need.

BRIEF SUMMARY

The present invention provides a system and method of effectively removing ice that may have formed on gas turbine engine compressor inlet guide vanes and/or preventing, or at least inhibiting, reformation of ice on gas turbine engine compressor inlet guide vanes after the ice has been removed.

In one embodiment, a method of removing ice formed on the inlet guide vanes of a compressor includes determining if flow through the compressor is below a predetermined flow value. If the flow through the compressor is below the predetermined flow value, the inlet guide vanes are repeatedly moved between at least two predetermined positions.

In another embodiment, a compressor inlet guide vane control system includes inlet guide vane command generation means and flow error anti-ice means. The inlet guide vane command generation means supplies inlet guide vane position commands. The flow error anti-ice means receives a flow error, determines if the flow error is greater than a predetermined value, and, if the flow error is greater than the predetermined value, modifies the inlet guide vane position commands such that the modified inlet guide vane commands will command inlet guide vanes to repeatedly move between at least two predetermined positions.

Other independent features and advantages of the preferred inlet guide vane control system and method will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although the inlet guide vane actuation and control system and method are described as being implemented in a gas turbine engine load compressor, and most notably a load compressor of an auxiliary power unit, it will be appreciated that the system and method may also be implemented in various other gas turbine engines and components thereof that include inlet guide vanes. Moreover, while control logic configurations are, for clarity and ease of description, depicted and described herein using discrete logic representations, it will be appreciated that the control logic may be implemented in hardware, software, firmware, or various combinations thereof.

Figure 1:
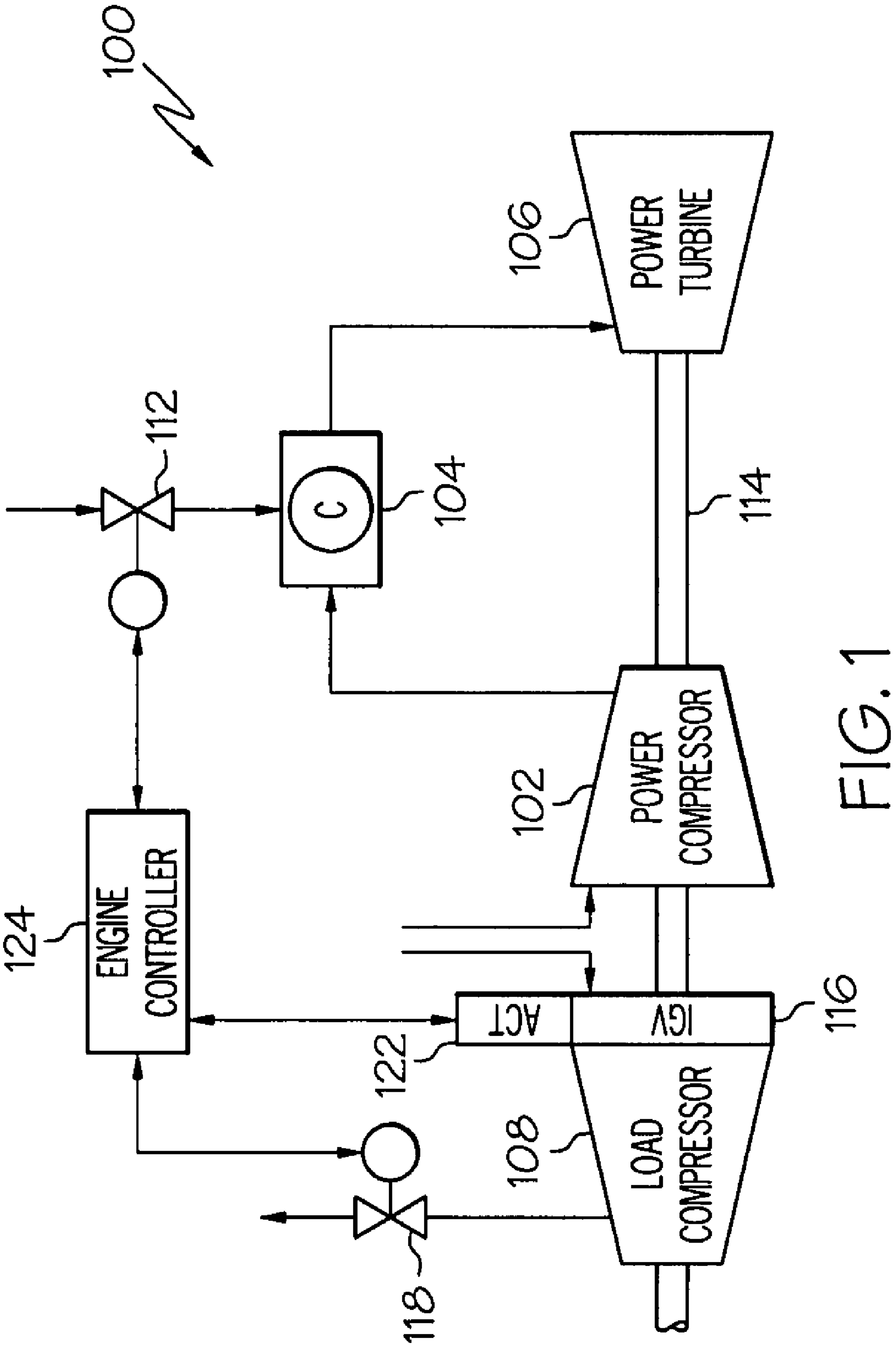
FIG. 1 is a schematic representation of an embodiment of an exemplary auxiliary power unit (APU) that may implement the present invention.

Turning now to FIG. 1, an embodiment of an exemplary auxiliary power unit (APU) 100 is shown in simplified schematic form. The APU 100 includes a power compressor 102, a combustor 104, a power turbine 106, and a load compressor 108. During operation of the APU 100, the power compressor 102 draws ambient air into an inlet, compresses the air, and supplies the compressed air to the combustor 104. It will be appreciated that the compressor 102 may be implemented using any one of numerous types of compressors now known or developed in the future. For example, the power compressor 102 may be a single-stage or multi-stage centrifugal compressor.

The combustor 104 receives the compressed air from the power compressor 102, and also receives a flow of fuel from a non-illustrated fuel source via a fuel metering valve 112. The fuel and compressed air are mixed within the combustor 104, and are ignited to produce relatively high-energy combustion gas. The combustor 104 may be implemented as any one of numerous types of combustors now known or developed in the future. Non-limiting examples of presently known combustors include various can-type combustors, various reverse-flow combustors, various through-flow combustors, and various slinger combustors.

No matter the particular combustor configuration 104 used, the relatively high-energy combustion gas that is generated in the combustor 104 is supplied to the power turbine 106. As the high-energy combustion gas expands through the power turbine 106, it impinges on the turbine blades (not shown in FIG. 1), which causes the turbine 106 to rotate. It will be appreciated that the turbine 106 may be implemented using any one of numerous types of turbines now known or developed in the future including, for example, a vaned radial turbine, a vaneless radial turbine, and a vaned axial turbine. No matter the particular type of turbine that is used, the power turbine 106 includes an output shaft 114 that drives the power compressor 102 and the load compressor 108. Though not depicted, it will be appreciated that the power turbine 106, via the output shaft 114, may also drive a generator, a starter-generator, and/or an accessory gear box.

The load compressor 108, as just noted, is driven by the power turbine 106 via the output shaft 114. When driven, the load compressor 108 draws ambient air into an inlet, via a plurality of inlet guide vanes 116, and compresses the air. The compressed air may be supplied to various pneumatic loads via a bleed air valve 118. For clarity, the pneumatic loads are not depicted in FIG. 1, but may include, for example, an environmental control system and main engine starting air for one or more main engines. It will additionally be appreciated that the load compressor 108 may be implemented using any one of numerous types of compressors now known or developed in the future. For example, the load compressor 108 may be a single-stage or multi-stage centrifugal compressor.

As noted above, ambient air is drawn into the load compressor 108 via a plurality of inlet guide vanes 116. The inlet guide vanes 116 are disposed adjacent the inlet of the load compressor 108 and are movable, via one or more inlet guide vane actuators 122, to a plurality of positions. As is generally known, air flow into and through the load compressor 108 may be regulated by adjusting the position of the inlet guide vanes 116. The inlet guide vane actuators 122, and thus the positions of the inlet guide vanes 116, are controlled via inlet guide vane control logic that, at least in the depicted embodiment, is disposed within an engine controller 124, an embodiment of which will now be briefly described.

The engine controller 124 controls the overall operation of the engine 100. More specifically, at least in the depicted embodiment, the engine controller 124 implements fuel control logic to control fuel flow rate to the combustor 104 by, among other things, controlling the position of the fuel metering valve 112. The engine controller 124 also implements suitable control logic to control the position of the bleed air valve 118, and inlet guide vane actuation logic to control the positions of the inlet guide vanes 116. A detailed description of the fuel control logic and the logic used to control the position of the bleed air valve 118 is not needed to fully describe or enable the claimed invention, and will therefore not be provided. However, the inlet guide vane actuation logic and the functionality implemented thereby will now be described in more detail.

Figure 2:
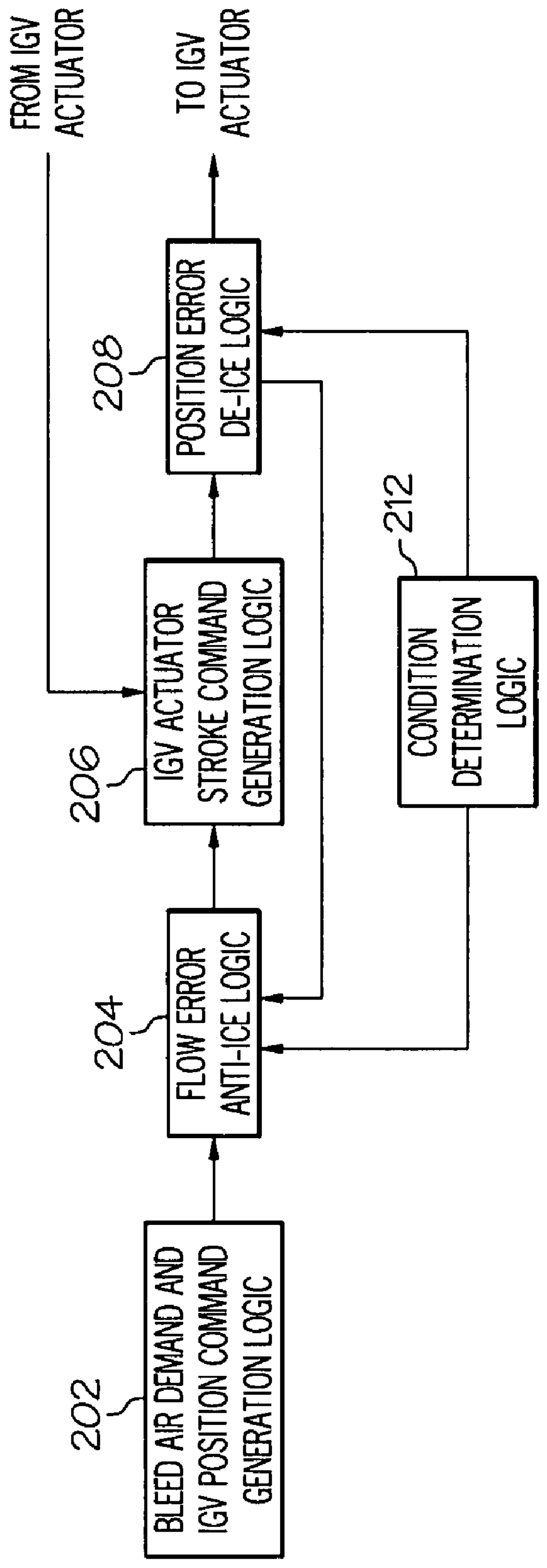
FIG. 2 is a functional block diagram of an exemplary embodiment of inlet guide vane actuation control logic that may be implemented in the APU of FIG. 1.

With reference now to FIG. 2, a functional block diagram of an exemplary embodiment of the inlet guide vane actuation control logic 200 is depicted. The control logic 200 includes bleed air demand and inlet guide vane (IGV) position command generation logic 202, flow error anti-ice logic 204, IGV actuator stroke command generation logic 206, position error de-ice logic 208, and condition determination logic 212. The bleed air demand and IGV position command generation logic 202 receives various signals representative of aircraft and aircraft system status. In response to these signals, the bleed air demand and IGV position command generation logic 202 determines the demand for bleed air from the load compressor 108 and, based on the determined demand, generates appropriate IGV position commands. The IGV position commands are supplied to the flow error anti-ice logic 204.

The flow error anti-ice logic 204 receives the IGV position commands and a condition status signal from the condition determination logic 212. The flow error anti-ice logic 204, in response to the condition status signal supplied from the condition determination logic 212, may or may not modify the IGV position commands. The flow error anti-ice logic 204 then supplies the modified or unmodified IGV position commands to the IGV actuator stroke command generation logic 206.

The IGV actuator stroke command generation logic 206 receives the IGV position commands, whether modified or unmodified, from the flow error anti-ice logic 204, and IGV actuator position feedback signals from the inlet guide vane actuator(s) 122. The IGV actuator stroke command generation logic 206, in response, generates appropriate actuator stroke commands. The IGV actuator stroke commands are then supplied to the position error de-ice logic 208.

The position error de-ice logic 208 receives the IGV actuator stroke commands and the condition status signal from the condition determination logic 212. The position error de-ice logic 208, in response to the condition status signal supplied from the condition determination logic 212, may or may not modify the IGV actuator stroke commands. The position error anti-ice logic 208 then supplies the modified or unmodified IGV actuator stroke commands to the IGV actuator(s) 122. As FIG. 2 also depicts, the position error de-ice logic 208 is coupled to the flow error ant-ice logic 204. This is because the position error de-ice logic 208 is also operable to selectively modify the IGV position commands supplied from the bleed air demand and IGV position command generation logic 202.

The condition determination logic 212, as just noted, supplies a condition status signal to both the flow error anti-ice logic 204 and the position error de-ice logic 208. The condition status signal is, at least in the depicted embodiment, a binary signal indicating whether or not the aircraft, various aircraft systems, and one or more parameters are in predetermined states. If the aircraft, the various aircraft systems, and one or more parameters are in the predetermined states, then the condition status signal supplied by the condition determination logic 212 to the flow error anti-ice logic 204 and the position error de-ice logic 208 will enable these logics 204, 208 to modify the IGV position commands and the IGV actuator stroke commands, respectively, if other predetermined conditions, determined internally within these logics 204, 208, are also met.

Figure 3A:
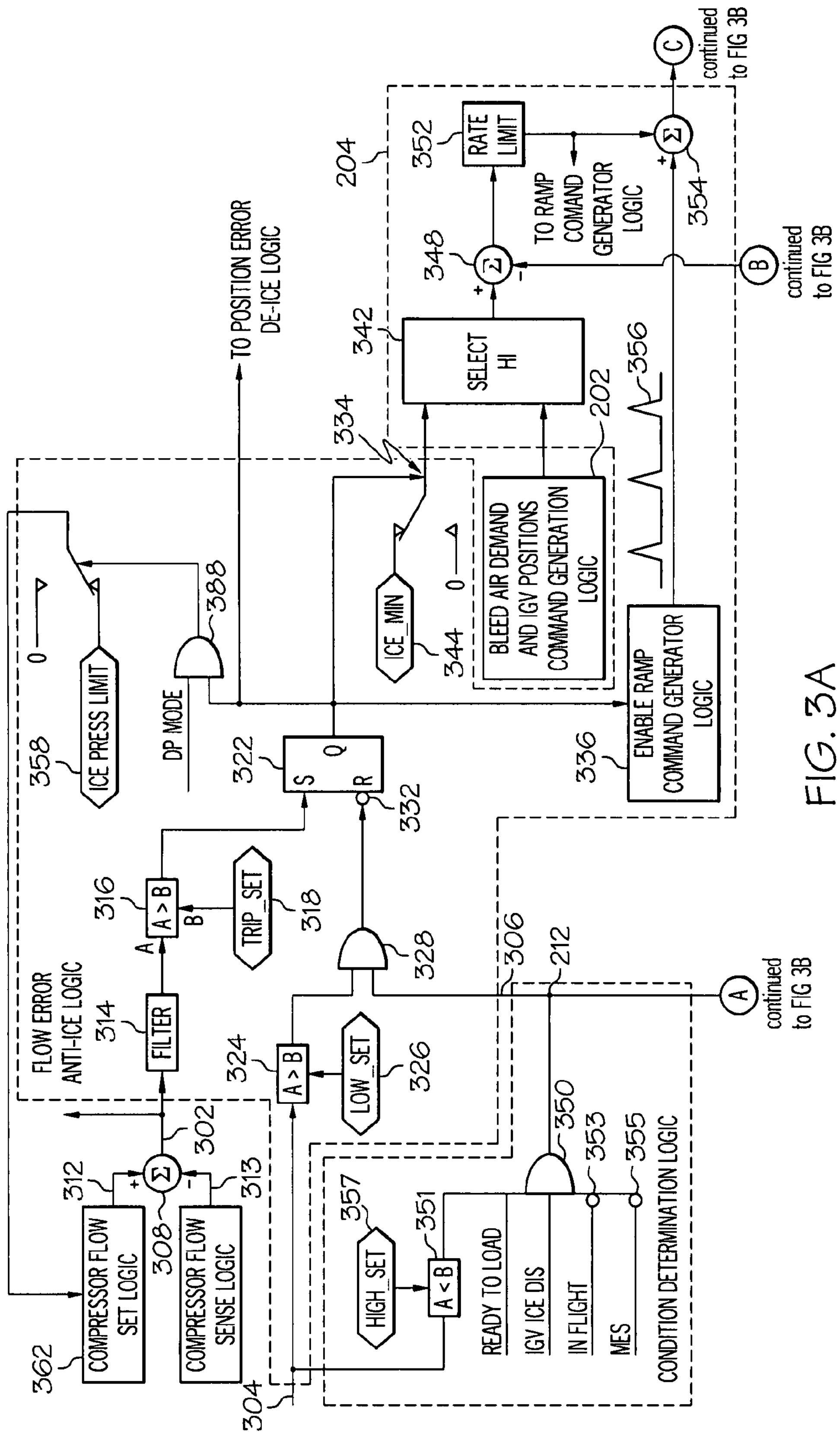
FIGS. 3A and 3B are schematic representations of embodiments of various logics that may be used to implement portions of the inlet guide vane actuation control logic of FIG. 2.
Figure 3B:
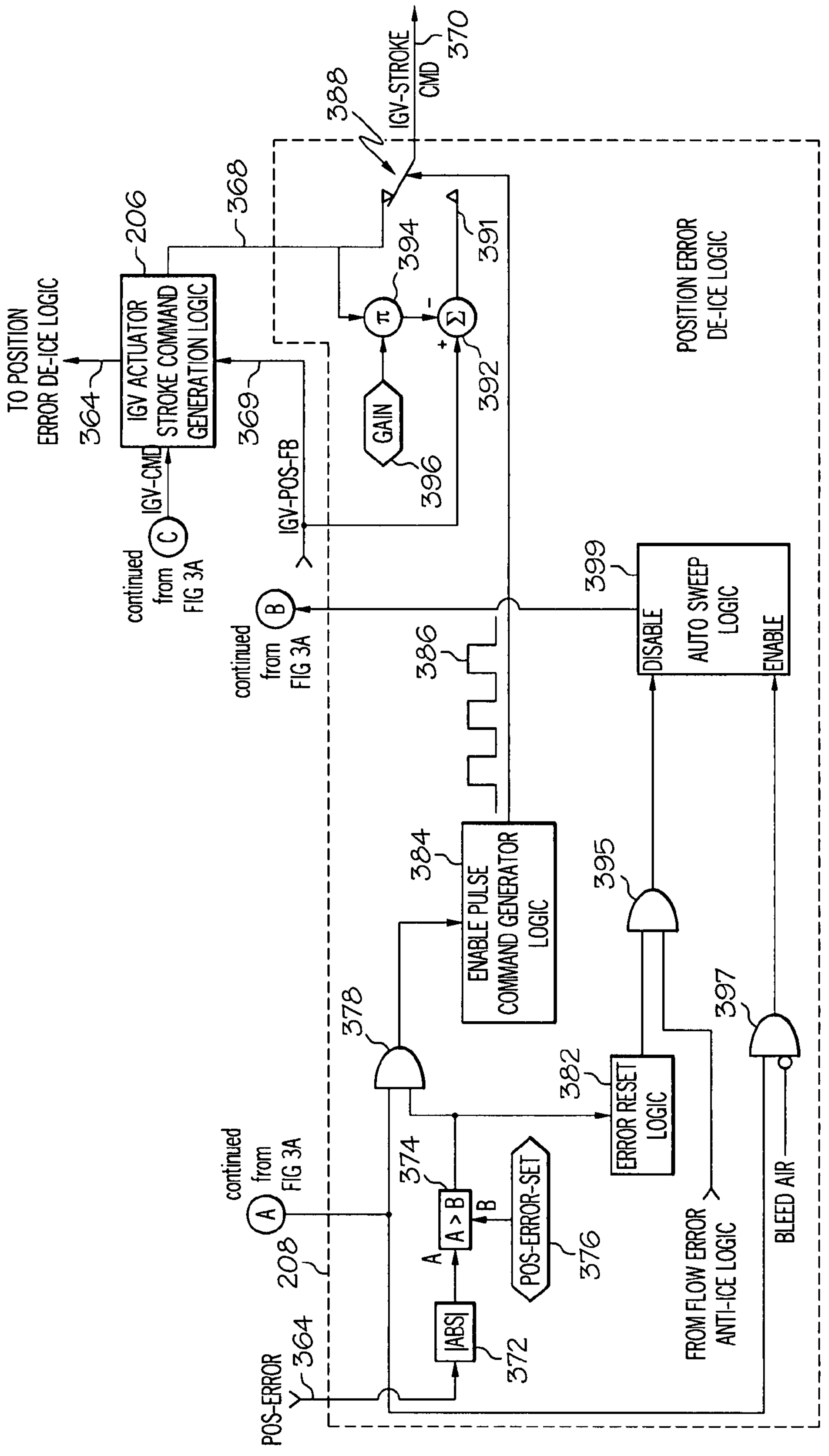

Before proceeding further it is noted that the bleed air demand and IGV position command generation logic 202 and the IGV actuator stroke command generation logic 206 are preferably implemented using conventionally known logic. As such, a detailed description of these logics 202, 206 will not be further provided. However, with reference now to FIG. 3, a more detailed schematic representation of an exemplary embodiment of the flow error anti-ice logic 204, the position error de-ice logic 208, and the condition determination logic 212, and the interconnections of these logics with the bleed air demand and IGV position command generation logic 202 and the IGV actuator stroke command generation logic 206, is depicted and will now be described.

Beginning with the flow error anti-ice logic 204, it is seen that this logic 204 receives a signal representative of load compressor flow error 302, a signal representative of load compressor inlet temperature 304, and the condition status signal 306 from the condition determination logic 212. The flow error anti-ice logic 204 is configured, in response to the load compressor flow error signal 302 and the load compressor inlet temperature signal 304, to determine if flow through the load compressor 108 is below a predetermined flow value and if compressor inlet temperature is above a predetermined low temperature value, respectively. If these two conditions are met, and the condition status signal 306 is such that it will enable the flow error anti-ice logic 204, then the flow error anti-ice logic 204 modifies the IGV position commands generated by the bleed air demand and IGV position command generation logic 202. Specifically, the flow error anti-ice logic 204 will modify the IGV position commands such that the modified IGV position commands will command the inlet guide vanes 116 to repeatedly move between at least two positions. In a particular preferred embodiment, the modified IGV position commands will command the inlet guide vanes 116 to move, at a specified periodicity, between a first position and a second position. The depicted configuration for implementing this functionality will now be described.

The flow error signal 302, which is representative of the difference between commanded and sensed load compressor flow, is supplied to the flow error anti-ice logic 204 from difference logic 308. To supply this signal, the difference logic 308 receives a signal representative of commanded compressor flow 312 and a signal representative of sensed compressor flow 313, determines the difference, and supplies the flow error signal 302 to the flow error anti-ice logic 204. Within the flow error anti-ice logic 204, a filter 314 filters the flow error signal 302, and a comparator 316 compares the filtered flow error to a predetermined flow error trip point 318. If the filtered flow error is greater than the predetermined flow error trip point 318, then a logical "1" is supplied to the SET (S) input of flip-flop logic 322.

The load compressor inlet temperature signal 304 is also supplied to a comparator 324. The comparator 324 compares the compressor inlet temperature signal 304 to a predetermined low temperature value 326. If the load compressor inlet temperature signal 304 indicates that load compressor inlet temperature is greater than the predetermined low temperature value 326, then a logical "1" is supplied to AND logic 328. It will be appreciated that the predetermined low temperature value 326 is a temperature at which, if load compressor inlet temperature is at or below, ice formation on the inlet guide vanes 116 will not occur.

In addition to being coupled to the comparator 324, the AND logic 328 is also coupled to receive the condition status signal 306 from the condition determination logic 212. If, as will be described in more detail further below, the aircraft, the various aircraft systems, and one or more parameters are in the predetermined states, then the condition status signal supplied by the condition determination logic 212 is a logical "1." Thus, if load compressor inlet temperature is greater than the predetermined low temperature value 326 and the aircraft, the various aircraft systems, and one or more parameters are in the predetermined states, then the AND logic 328 will supply a logical "1" to a logical inverter 332, which is coupled to a RESET (R) input of the flip-flop logic 322. As a result, a logical "0" will be applied to the flip-flop RESET input, and the flip-flop logic output (Q) will follow the signal on its SET input, which is a logical "1."

The logical "1" on the flip-flop output (Q) is supplied to a logic switch 334, a ramp command generator logic 336, and another AND logic 338. The logical switch 334 is coupled to SELECT HI logic 342 and, depending on the logical value on the flip-flop output (Q), supplies either a zero value or a minimum position value 344 to the SELECT HI logic 342. If the logical value on the flip-flop output (Q) is a logical "0," then the logic switch 334 supplies the zero value to the SELECT HI logic 342, and if the logical value on the flip-flop output (Q) is a logical "1," then the logic switch 334 supplies the minimum position value 344 to the SELECT HI logic 342. As is generally known, SELECT HI logic will output a signal representative of the highest value supplied to each of its inputs. Thus, in the depicted embodiment, the SELECT HI logic 342 will supply on its output a signal representative of the greater of the minimum position value 344 and the IGV position command supplied by the bleed air demand and IGV position command generation logic 202. In either case, the signal on the output of the SELECT HI logic 342 is supplied to summation logic 348.

The summation logic 348 receives the signal supplied by the SELECT HI logic 342, and is also coupled to receive a signal from the position error de-ice logic 208, which is described in more detail further below. The summation logic 348 generates a command signal that is representative of the summation of these two signals, and supplies this command signal to rate limiter logic 352. The rate limiter logic 352 limits the rate-of-change of the command signal supplied from the summation logic 348, and supplies the rate-limited signal to second summation logic 354. The second summation logic 354 is also coupled to receive a signal supplied from the ramp command generator logic 336, and is configured to generate and supply an IGV position command signal (IGV_CMD) to the IGV actuator stroke command generation logic 206 that is representative of the summation of these two signals.

The ramp command generator logic 336 is selectively enabled and disabled by the logical value supplied by the flip-flop logic 322. More specifically, if the flip-flop logic 322 is supplying a logical "0," then the ramp command generator logic 336 is disabled and it generates and supplies no signal. Conversely, if the flip-flop 322 is supplying a logical "1," then the ramp command generator logic 336 generates ramp commands 356. When enabled, the ramp commands 356 generated by the ramp command generator logic 336, as was just noted, are supplied to the second summation logic 354. Thus, the IGV position command signal (IGV_CMD) generated by the second summation logic 354 will repeatedly increase from a first position to a second position and then back down to the first position. As a result, the IGV actuator stroke command generation logic 206 will supply commands that will cause the inlet guide vane actuator(s) 122 to repeatedly move the inlet guide vanes 116 from the first position to the second position and then back to the first position. It will be appreciated that the first position will be either the minimum position value 344 or the IGV position command supplied by the bleed air demand and IGV position command generation logic 202, depending upon which is greater. Moreover, the second position will be a position that is greater than the first position, and is preferably set within the ramp command generator logic 336.

Figure 4:
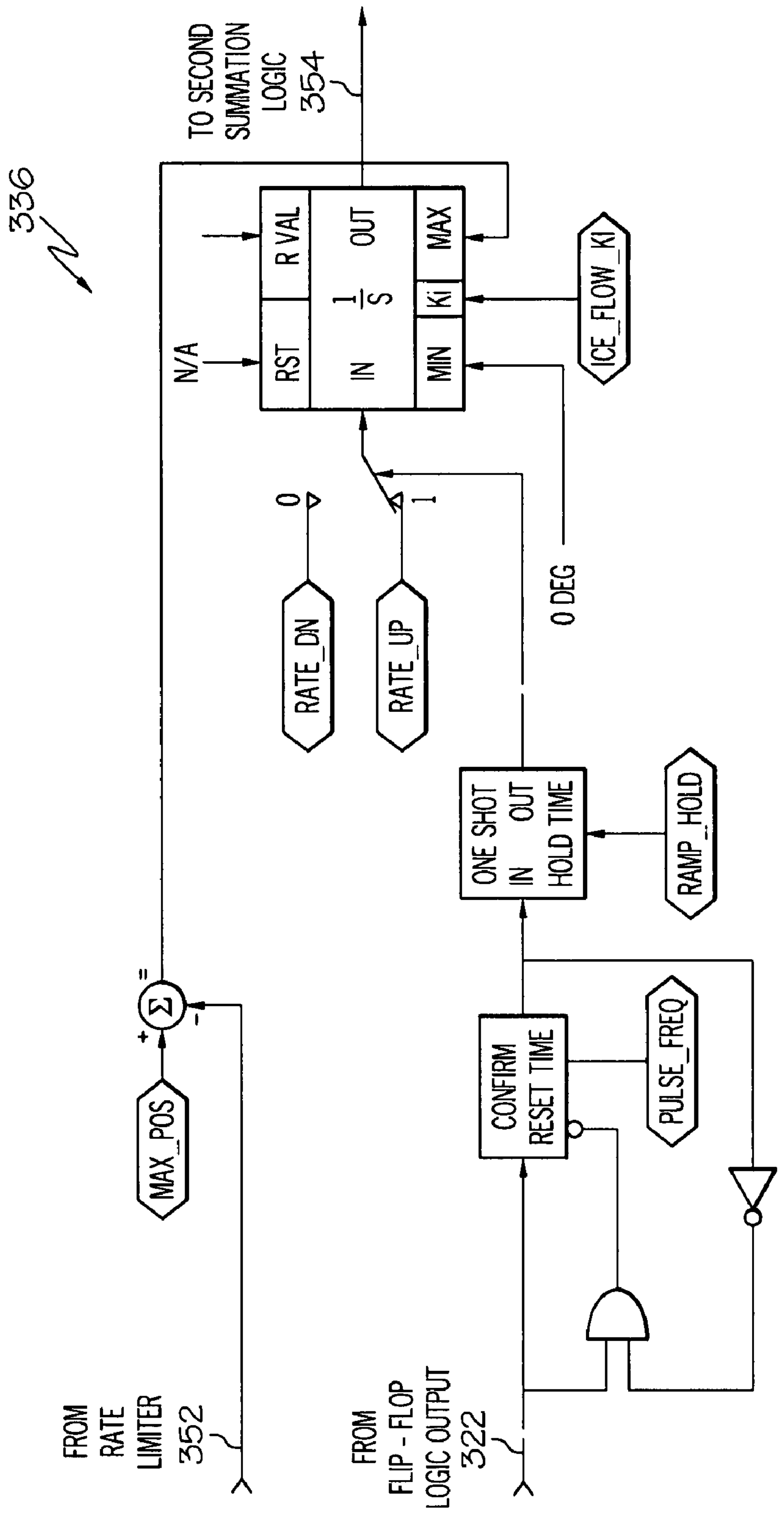
FIG. 4 depicts a schematic representation of an embodiment of logic that may be used to implement ramp command generation logic.

The ramp command generator logic 336 may or may not be configured to generate the ramp commands 356 with a set periodicity, and may be implemented using any one of numerous logic configurations. One particular logic configuration that may be used to implement the ramp command generator logic 336 is depicted in FIG. 4. Upon viewing FIG. 4, it may be seen that the second position is set by a maximum position value (MAX_POS). Moreover, this particular ramp command generator logic 336 generates the ramp commands 356 with a set periodicity and duration based on particular values (PULSE_FREQ and RAMP_HOLD), both of which may be any one of numerous values. In one particular embodiment, however, these values are selected so that the ramp command generator logic 336 generates ramp commands 356 having a period of 60 seconds and a duration of 4.0 seconds. With such an embodiment, if the flow error anti-ice formation logic 204 is enabled, it causes the inlet guide vanes 116 to be moved to a first position and then, at 60 second intervals, moved relatively quickly from the first position to the second position and then back to the first position.

From the above it is seen that the flow error anti-ice logic 204, when enabled, causes the inlet guide vanes 116 to move relatively rapidly between at least two positions. This relatively rapid movement of the inlet guide vanes 116, coupled with the relatively large and rapid change in airflow, causes any ice that may have formed on the inlet guide vanes 116 to shed and pass through the load compressor 108. The continued movement of the inlet guide vanes 116, for as long as the flow error anti-ice logic 204 is enabled, also prevents, or at least inhibits, further ice formation on the inlet guide vanes 116.

Before describing the position error de-ice logic 208 in more detail, it was noted above that, at least in the depicted embodiment, the logical value on the flip-flop logic output (Q) is additionally supplied to another AND logic 338. This AND logic 338 is also coupled to receive a logic value representative of whether the engine is (i.e., logical "1") or is not (i.e., logical "0") operating in what is referred to as a "duct pressurization mode" (DP_MODE). In this mode the load compressor 108 is being used to pressurize the aircraft systems. It may thus be seen that if the engine 100 is in the duct pressurization mode and the flow error anti-ice formation logic 204 is enabled, that an increased setpoint value 358 is supplied to compressor flow set logic 362. The compressor flow set logic 362, which preferably is conventionally implemented, supplies the signal representative of commanded compressor flow 312 to the difference logic 308 and to various other non-illustrated logic. The increased set point value 358 is used to alter the commanded compressor flow so that more flow will go out the surge valve (not depicted). It will be appreciated that this particular logic may not be needed or desired for certain engine embodiments.

Turning now to the position error de-ice logic 208, it is seen that this logic 208 receives a signal representative of position error 364 from the IGV actuator stroke command generation logic 206, and the condition status signal 306 from the condition determination logic 212. The position error de-ice logic 208 is configured, in response to the position error signal 364, to determine if position error exceeds a predetermined error magnitude. If so, and the condition status signal 306 is such that it will enable the position error de-ice logic 208, then the position error de-ice logic 208 modifies the IGV actuator stroke commands generated by the IGV actuator stroke command generation logic 206. Specifically, the position error de-ice logic 208 will modify the IGV actuator stroke commands such that the modified IGV actuator stroke commands will repeatedly command the inlet guide vane actuator(s) 122 to move the inlet guide vanes 116 in at least two predetermined directions. In a particular preferred embodiment, the modified IGV actuator stroke commands will command the inlet guide vane actuator(s) 122 to move the inlet guide vanes 116, at a specified periodicity, in the two directions. The depicted configuration for implementing this functionality will now be described.

The position error signal 364, as may be appreciated, is representative of the difference between commanded actuator position and sensed actuator position, and is supplied to the position error de-ice logic 208 from the IGV actuator stroke command generation logic 206. In particular, the IGV stroke command generation logic 206 compares the IGV actuator stroke command 368 generated by the IGV actuator stroke command generation logic 206 and the sensed IGV actuator position (IGV_POS_FB) 369 and generates and supplies the position error signal 364. The position error signal 364, as may also be appreciated, may be either a positive or a negative value. As such, this signal 364 is supplied to absolute value logic 372, which supplies a signal representative of the absolute value of the position error signal (i.e., position error magnitude) to a comparator 374. The comparator 374 compares the position error magnitude to a predetermined position error trip point 376. If the position error magnitude is greater than the predetermined position error trip point 376, then a logical "1" is supplied to AND logic 378 and to error reset logic 382, otherwise a logical "0" is supplied to the AND logic 368 and to the error reset logic 382.

In addition to being coupled to the comparator 374, the AND logic 378 is also coupled to receive the condition status signal 306 from the condition determination logic 212. If, as will be described in more detail further below, the aircraft, the various aircraft systems, and one or more parameters are in the predetermined states, then the condition status signal supplied by the condition determination logic 212 is a logical "1." Thus, if the position error magnitude exceeds the predetermined position error trip point 376 and the aircraft, the various aircraft systems, and one or more parameters are in the predetermined states, then the AND logic 378 will supply a logical "1" to pulse command generator logic 384.

Figure 5:
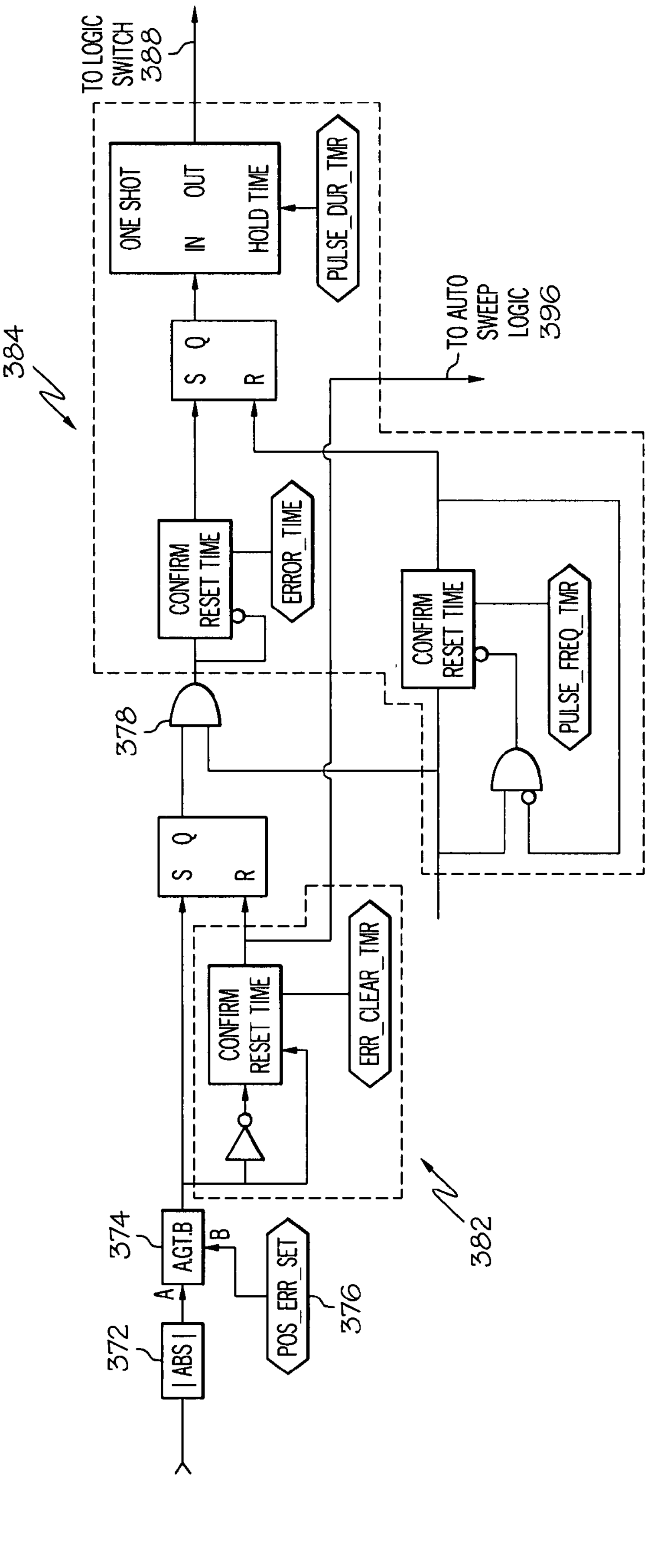
FIG. 5 depicts a schematic representation of an embodiment of logic that may be used to implement pulse command generation logic.

The pulse command generator logic 384 is selectively enabled and disabled by the logical value supplied by the AND logic 378. More specifically, if the AND logic 378 is supplying a logical "0," then the pulse command generator logic 384 is disabled and it generates and supplies no signal. Conversely, if the AND logic 378 is supplying a logical "1," then the pulse command generator logic 384 generates a series of pulse commands 386. When enabled, the pulse commands 386 generated by the pulse command generator logic 384, which represent variations between logical "1" and logical "0" states, are supplied to a logic switch 388. The pulse command generator logic 384 may or may not be configured to generate the pulse commands 386 with a set periodicity, and may be implemented using any one of numerous logic configurations. One particular logic configuration that may be used to implement the pulse command generator logic 384 is depicted in FIG. 5, which also shows a particular logic configuration that may be used to implement the error reset logic 382. Upon viewing FIG. 5, it may be seen that this particular pulse command generator logic 384 generates the pulse commands 386 with a set periodicity and duration based on particular values (PULSE_FREQ_TMR and PULSE_DUR_TMR, respectively), both of which may be any one of numerous values. In one particular embodiment, the pulse command generator logic 384 generates pulse commands 386 having a period of 4 seconds and a duration of 1 second. With such an embodiment, if the position error de-ice logic 208 is enabled, the inlet guide vane actuator(s) 122 are repeatedly commanded to move the inlet guide vanes 116 in a first direction for about 3 seconds and then in a second direction for about 1 second.

No matter the specified manner in which the pulse commands 386 are generated, the logic switch 388, in response to the pulse commands 386, selectively supplies IGV actuator stroke commands (IGV_STROKE_CMD) 370 to the inlet guide vane actuator(s) 122 from one of two sources. The first source is the IGV actuator stroke command generation logic 206 and the second source is difference logic 392. When the pulse commands 386 supplied from the pulse command generator logic 384 are in a logical "0" state (or when the pulse command generator logic 384 is not enabled), then the logic switch 388 couples the IGV actuator stroke commands 368 generated by the IGV stroke command generator logic 206 to the inlet guide vane actuator(s) 122. Conversely, when the pulse commands 386 supplied from the pulse command generator logic 384 are in a logical "1" state, then the logic switch 388 supplies modified IGV actuator stroke commands 391 generated by the difference logic 392 to the inlet guide vane actuator(s) 122.

The difference logic 392 is coupled to receive the sensed IGV actuator position (IGV_POS_FB) 369 and a signal supplied from multiplier logic 394. The multiplier logic 394 is coupled to receive the IGV actuator stroke command generated by the IGV actuator stroke command generation logic 206 and a predetermined gain value 396, and is configured to supply a signal representative of the product of these two values. It will be appreciated that the particular value assigned to the gain value 396 may vary, but in one particular embodiment the gain value 396 is set to 2.0. With this gain value 396 the multiplication logic 394 will supply a signal representative of twice the IGV actuator stroke command error generated by the IGV actuator stroke command generation logic 206. Thus, if the IGV actuator stroke command error generated by the IGV actuator stroke command generation logic 206 is "X," then the signal generated and supplied by the multiplication logic 394 will be "2X."

No matter the particular value used for the gain value 396, the difference logic 392, upon receipt of the product signal and the sensed IGV actuator position (IGV_POS_FB) 369, generates and supplies the modified IGV actuator stroke commands 391. Thus, the IGV actuator stroke command (IGV_STROKE_CMD) 370 supplied to the inlet guide vane actuator(s) 122 will repeatedly, and relatively rapidly, command the inlet guide vane actuator(s) 122 to move the inlet guide vanes 116 in two directions. As a result, any ice formed on the inlet guide vanes 116 that prevented inlet guide vane movement, and thus resulted in the position error exceeding the position error trip point 376, will break free and allow for the inlet guide vanes 116 to be moved more freely.

As noted above, the comparator 374, in addition to being coupled to AND logic 378, is coupled to error reset logic 382. The error reset logic 382 is in turn coupled to an input of OR logic 395. The error reset logic 382 is configured to supply either a logical "1" or a logical "0" to the OR logic 395. More specifically, when the position error magnitude is greater than the position error trip point 376, and thus the comparator 374 supplies a logical "1," the error reset logic 382 will in turn supply a logical "0" to the OR logic 395. Conversely, when the position error magnitude is not greater than the position error trip point 376, and thus the comparator 374 supplies a logical "0," the error reset logic 382 will in turn supply a logical "1" to the OR logic 395.

The OR logic 395 additionally has an input coupled to the flip-flop logic output (Q) in the flow error anti-ice logic 204, and an output coupled to auto sweep logic 399. Thus, the OR logic 395 will supply a logical "1" to the auto sweep logic 399 when either the error reset logic 382 or the flip-flop logic output (Q) is a logical "1." Otherwise, the OR logic 395 will supply a logical "0" to the auto sweep logic 399. The auto sweep logic 399, which will be described further below, may only be enabled when the OR logic 395 is supplying a logical "0." Thus, the auto sweep logic 399 may only be enabled when the position error de-ice logic pulse command generator logic 384 is not enabled (e.g., the error reset logic 382 is supplying a logical "0") and the flow error anti-ice formation logic ramp command generator logic 336 is not enabled (e.g., the flip-flop logic output (Q) is a logical "0").

As just noted, the auto sweep logic 399 may only be enabled if the position error de-ice logic pulse command generator logic 384 is not enabled and the flow error anti-ice formation logic ramp command generator logic 334 is not enabled. To enable the auto sweep logic 399 under these conditions, another AND logic 397 must supply a logical "1" to the auto sweep logic 399. The AND logic 397 will supply a logical "1" to the auto sweep logic 399 if the condition determination logic 212 supplies a logical "1" and a signal indicating that the bleed air valve 118 is open is a logical "0" (which would mean that the bleed air valve 118 is closed).

The auto sweep logic 399 is configured, when enabled, to repeatedly supply an IGV command offset to, and remove the IGV command offset from, the previously described summation logic 348 in the flow error anti-ice formation logic 204. The summation logic 348, as noted above, also receives the signal supplied by the SELECT HI logic 342. The summation logic 348 generates a command signal that is representative of the summation of these two signals, and supplies this command signal to rate limiter logic 352, which in turn supplies the rate-limited signal to the second summation logic 354. The second summation logic 354, as described previously generates and supply an IGV position command signal (IGV_CMD) to the IGV actuator stroke command generation logic 206 that is representative of the summation of this signal and the output of the ramp command generator logic 336. As noted above, however, the auto sweep logic 399 may only be enabled when the position error de-ice logic pulse command generator logic 384 is not enabled and the flow error anti-ice formation logic ramp command generator logic 336 is not enabled. Thus, under these conditions the IGV position command signal supplied from the second summation logic 354 to the IGV actuator stroke command generation logic 206 will be only the rate-limited signal supplied from the rate limiter logic 352. What this means is that whenever the auto sweep logic 392 supplies the IGV command offset, the IGV position command signal supplied to the IGV actuator stroke command generation logic 206 will change by an amount equivalent to the IGV command offset.

Figure 6:
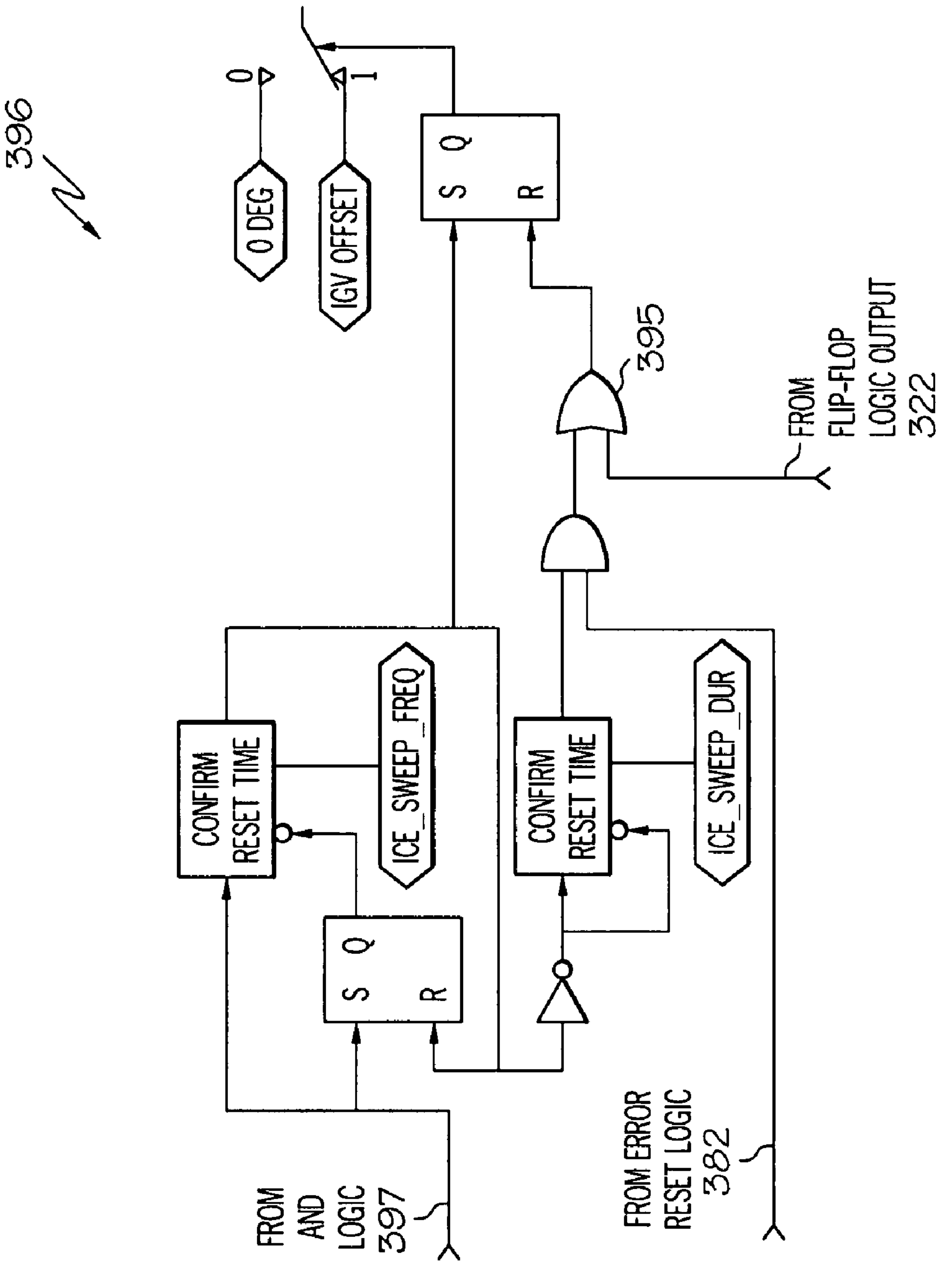
FIG. 6 depicts a schematic representation of an embodiment of logic that may be used to implement an auto sweep logic function.

The auto sweep logic 399 may or may not be configured to supply the IGV command offset at a set periodicity, and may be implemented using any one of numerous logic configurations. One particular logic configuration that may be used to implement the auto sweep logic 399 is depicted in FIG. 6. This particular auto sweep logic 399 configuration generates the IGV command offset (IGV_OFFSET) at a set periodicity and for a set duration based on particular values (ICE_SWEEP_FREQ and ICE_SWEEP_DUR, respectively). It will be appreciated that the IGV command offset, periodicity, and duration may each be set to any one of numerous values. In one particular embodiment, the auto sweep logic 399 supplies the IGV command offset every 60 seconds, and for a duration of 4 seconds. With such an embodiment, if the auto sweep logic 399 is enabled, every 60 seconds the inlet guide vane actuator(s) 122 are commanded to move the inlet guide vanes 116 from an initial position to a more open position for 4 seconds, and then back to the initial position.

No matter the manner in which the auto sweep logic 399 is specifically implemented, this additional function of the position error de-ice logic 208, when enabled, will cause the inlet guide vanes 116 to be repeatedly moved from an initial position, to a more open position, and then back to the initial position. This will help ensure that when the load compressor 108 is subsequently used to supply bleed air (e.g., the bleed air valve 118 is open), the inlet guide vanes 116 will not have ice formed thereon that would prevent free movement of the inlet guide vanes 116.

Finally, turning to the condition determination logic 212, it has been noted that this logic selectively allows enablement of both the flow error anti-ice formation logic 204 and the position error anti-ice logic 208. That is, the condition determination logic 212 allows these other two logics 204, 208 to be enabled only if the aircraft, the various aircraft systems, and one or more parameters are in the predetermined states. The particular logic configuration to implement this function may vary, but in the depicted embodiment the condition determination logic 212 is implemented using AND logic 350 and a comparator 351. The AND logic 350, at least in the depicted embodiment, includes at least five inputs, one of which is coupled to a first logical inverter 353, and a second of which is coupled to a second logical inverter 355.

The first logical inverter 353 is coupled to receive a signal representative of whether or not the load compressor 108 is supplying main engine start (MES) air (MES). If the load compressor 108 is supplying MES air, then this signal will be representative of a logical "1," and the first logical inverter 353 will supply a logical "0" to the AND logic 350. Conversely, if the load compressor 108 is not supplying MES air, then this signal will be representative of a logical "0," and the first logical inverter 353 will supply a logical "1" to the AND logic 350. The second logical inverter 355 is coupled to receive a signal representative of whether or not the aircraft is in flight (IN_FLIGHT). If the aircraft is in flight, then this signal will be representative of a logical "1," and the second logical inverter 355 will supply a logical "0" to the AND logic 350. Conversely, if the aircraft is not in flight, then this signal will be representative of a logical "0," and the second logical inverter 355 will supply a logical "1" to the AND logic 350.

The remaining three inputs to the AND logic 350 are coupled to receive a signal representative of a disable switch position (IGV_ICE_DIS), a signal representative of whether the load compressor 108 is ready to be loaded (READY_TO_LOAD), and a signal supplied from the comparator 351 representative of whether compressor inlet temperature is less than a predetermined temperature. The signal representative of disable switch position will be representative of a logical "0" if a non-illustrated disable switch is placed in a DISABLE (or equivalent) position, otherwise it will be representative of a logical "1." The disable switch, if included, allows airline operators to disable the functions of the flow error anti-ice formation logic 204 and the position error de-ice logic 208, if so desired.

The signal representative of whether the load compressor 108 is ready to be loaded will be representative of a logical "1" if the load compressor 108 is ready to be loaded, otherwise it will be representative of a logical "0." There may be any one or more of numerous conditions that may be sensed to determine if the load compressor 108 is ready to be loaded. In one particular embodiment, however, this signal is representative of a logical "1" when engine speed is at or above about 95% of full-speed.

The comparator 351 is coupled to receive the compressor inlet temperature signal 304, and is configured to compare it to a predetermined high temperature value 357. If the load compressor inlet temperature signal 304 indicates that load compressor inlet temperature is below the predetermined high temperature value 357, then a logical "1" is supplied to AND logic 350. It will be appreciated that the predetermined high temperature value 357 is a temperature which, if load compressor inlet temperature is at or below, ice formation on the inlet guide vanes 116 may occur.

The inlet guide vane control system and method disclosed herein effectively removes ice that may have formed on the load compressor inlet guide vanes 116 and/or prevents, or at least inhibits, reformation of ice on the load compressor inlet guide vanes 116 after the ice has been removed.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of removing ice formed on inlet guide vanes of a compressor, comprising the steps of:

determining if flow through the compressor is below a predetermined flow value; and if the flow through the compressor is below the predetermined flow value, repeatedly moving the inlet guide vanes between a first position and a second predetermined position by:

moving the inlet guide vanes to the first position; and at a predetermined period, moving the inlet guide vanes from the first position to at least the second predetermined position and then back to the first position.

2. The method of claim 1, further comprising:

determining if compressor inlet temperature is below a first predetermined temperature value; and repeatedly moving the inlet guide vanes between the first position and the second predetermined position if (i) the flow through the compressor is below the predetermined flow value and (ii) the compressor inlet temperature is below the first predetermined temperature value.

3. The method of claim 2, further comprising:

determining if the compressor inlet temperature is above a second predetermined value; and repeatedly moving the inlet guide vanes between the first position and the second predetermined position if (i) the flow through the compressor is below the predetermined flow value and (ii) the compressor inlet temperature is below the first predetermined temperature value and above the second predetermined temperature value.

4. The method of claim 3, wherein the second predetermined temperature value is a value at or below which ice will not form on the inlet guide vanes.

5. The method of claim 2, wherein the compressor is installed in an aircraft, and wherein the method further comprises:

determining if the aircraft is in a predetermined state; and repeatedly moving the inlet guide vanes between the first position and the second predetermined position if (i) the flow through the compressor is below the predetermined flow value, (ii) the compressor inlet temperature is below the first predetermined temperature value, and (iii) the aircraft is in the predetermined state.

6. The method of claim 5, wherein the compressor forms part of an auxiliary power unit (APU), and wherein the predetermined state comprises:

the compressor is not supplying main engine start air;

the aircraft is not in flight; and the APU is in a predetermined state.

7. The method of claim 1, wherein:

the inlet guide vanes are moved from the first position to at least the second predetermined position and then back to the first position for a predetermined movement time; and the predetermined movement time is less than 10% of the predetermined period.

8. The method of claim 1, wherein the predetermined period is 60 seconds.

9. The method of claim 1, wherein the first position is a position value that is less than the second predetermined position.

10. A method of removing ice formed on inlet guide vanes of a compressor, comprising the steps of:

determining if flow through the compressor is below a predetermined flow value; and;

if the flow through the compressor is below the predetermined flow value, repeatedly moving the inlet guide vanes, at a predetermined period, from a first position to a second predetermined position and then back to the first position, wherein:

the inlet guide vanes are moved from the first position to the second predetermined position and then back to the first position for a predetermined movement time, and the predetermined movement time is less than 10% of the predetermined period.

11. The method of claim 10, wherein the predetermined period is 60 seconds.

12. The method of claim 10, wherein the first position is a position value that is less than the second predetermined position.

13. The method of claim 10, further comprising:

determining if compressor inlet temperature is below a first predetermined temperature value; and repeatedly moving the inlet guide vanes between the first position and the second predetermined position if (i) the flow through the compressor is below the predetermined flow value and (ii) the compressor inlet temperature is below the first predetermined temperature value.

14. The method of claim 13, further comprising:

determining if the compressor inlet temperature is above a second predetermined value; and repeatedly moving the inlet guide vanes between the first position and the second predetermined position if (i) the flow through the compressor is below the predetermined flow value and (ii) the compressor inlet temperature is below the first predetermined temperature value and above the second predetermined temperature value.

15. The method of claim 14, wherein the second predetermined temperature value is a value at or below which ice will not form on the inlet guide vanes.

16. The method of claim 13, wherein the compressor is installed in an aircraft, and wherein the method further comprises:

determining if the aircraft is in a predetermined state; and repeatedly moving the inlet guide vanes between the first position and the second predetermined position if (i) the flow through the compressor is below the predetermined flow value, (ii) the compressor inlet temperature is below the first predetermined temperature value, and (iii) the aircraft is in the predetermined state.

17. The method of claim 16, wherein the compressor forms part of an auxiliary power unit (APU), and wherein the predetermined state comprises:

the compressor is not supplying main engine start air;

the aircraft is not in flight; and the APU is in a predetermined state.

* * * * *